United States Patent [19]
Klemmer et al.

[11] Patent Number: 5,730,545
[45] Date of Patent: Mar. 24, 1998

[54] APPARATUS FOR FASTENING THE END OF A SPRING STEEL STRIP

[75] Inventors: Herbert Klemmer, Nürtingen; Nikolaus Schefcsik, Schwaikheim; Wolfgang Clar, Waiblingen, all of Germany

[73] Assignee: Mercerdes-Benz A.G., Stuttgart, Germany

[21] Appl. No.: 753,881

[22] Filed: Dec. 2, 1996

[30] Foreign Application Priority Data

Dec. 2, 1995 [DE] Germany .................. 195 45 028.0

[51] Int. Cl.$^6$ ........................................ F16B 5/00
[52] U.S. Cl. .................. 403/373; 403/206; 403/208; 74/502.6
[58] Field of Search ......................... 403/373, 404, 403/405.1, 206, 207, 208, 209, 353, 13-14, 24; 74/502.6

[56] References Cited

U.S. PATENT DOCUMENTS

| | | |
|---|---|---|
| 2,727,220 | 12/1955 | Buchanan et al. ................. 403/373 X |
| 4,316,676 | 2/1982 | Turner ............................. 403/405.1 X |
| 4,662,590 | 5/1987 | Hungerford, Jr. ................. 403/353 X |
| 4,830,531 | 5/1989 | Condit et al. .................... 403/405.1 X |
| 5,203,068 | 4/1993 | Siring ............................. 74/502.6 X |

FOREIGN PATENT DOCUMENTS

| | | | |
|---|---|---|---|
| 2308004 | 11/1976 | France ............................. 403/353 |
| 2703897 | 8/1978 | Germany .......................... 403/353 |
| 1461111 | 1/1977 | United Kingdom ............... 403/208 |
| 2204103 | 11/1988 | United Kingdom ............... 403/373 |

*Primary Examiner*—Harry C. Kim
*Attorney, Agent, or Firm*—Evenson, McKeown, Edwards & Lenahan, P. L. L. C.

[57] ABSTRACT

An apparatus for fastening an end of a spring steel strip subjected to high tension. The end of the spring steel strip is clamped positively between two flat surfaces of two retainers in different positions, ensuring absolute security against loosening. For this purpose, the strip end is placed positively in an insert that is freely displaceable between the retainers and is clamped together with this insert between the retainers. The insert has transverse blades on its side facing away from the strip end, with which blades it engages the adjoining retainer positively, and thus in a displacement-proof manner, in the clamped state.

17 Claims, 2 Drawing Sheets

APPARATUS FOR FASTENING THE END OF A SPRING STEEL STRIP

BACKGROUND AND SUMMARY OF THE INVENTION

The invention relates to an apparatus for fastening of an end of a spring steel strip, and more particularly to a spring steel strip subjected to high tension.

There are many applications, for example a foot-operated parking brake of a motor vehicle, in which an end of a spring steel strip must be able to be clamped firmly between two retainers fixed in place in different positions. As a result of the various possible positions in which the strip end must be able to be clamped, only a surface-to-surface contact at the surfaces to be clamped is possible. In the case of an exclusively surface-to-surface contact between the strip end and the clamping surfaces of the retainers, sufficient retention cannot be achieved by clamping alone.

Therefore, there is a need for an apparatus for fastening of an end of a spring steel strip which can reliably hold the end even under a high load applied to the strip.

This and other needs have been met according to the present invention by providing an apparatus for fastening an end of a spring steel strip comprising: a spring steel strip having opposing wide sides and opposing narrow sides, the strip being bent at an angle at a bent area to define a bent end portion, the bent end portion defining notches extending toward each other from opposing of the narrow sides of the strip; an insert arranged at the bent end portion of the strip, the insert engaging the notches and the strip, the insert having a plurality of transverse blades extending across the width of the strip; and two retainers, each the retainer having a contact surface, the two retainers being bolted to one another such that the contact surface of one of the retainers engages the transverse blades of the insert, and such that the contact surface of the other of the retainers engages the wide side of the strip located opposite the insert, the retainers clamping the strip and the insert therebetween.

According to the present invention, the strip end is securely anchored in an insert and the end of the strip is clamped together with the insert at any point between two retainers with flat contact surfaces. A surface of the insert is provided with blades which can dig into the material of the adjoining retainer. Generally, such blades are not manufactured directly on the spring steel strip. However, if blades are manufactured directly on the spring steel strip, then the insert with blades is not required, since blades extending directly from the spring steel could then dig directly into the matching contact surface.

Other objects, advantages and novel features of the present invention will become apparent from the following detailed description of the invention when considered in conjunction with the accompanying drawings.

DETAILED DESCRIPTION OF THE DRAWINGS

Figure 1:
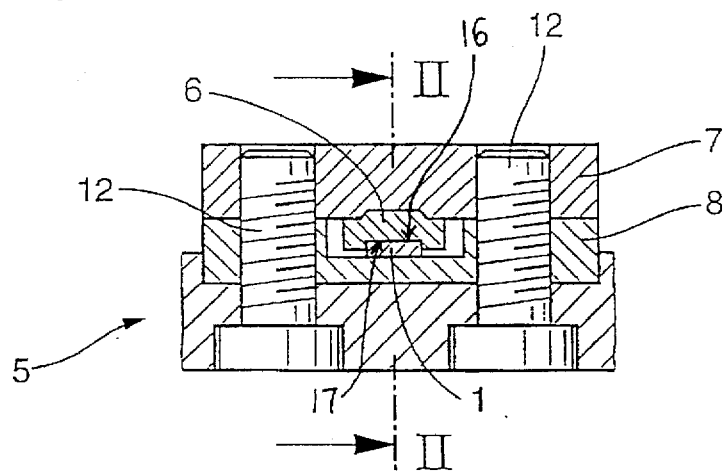
FIG. 1 is a sectional view of an apparatus for fastening of an end of a spring steel strip according to a preferred embodiment of the present invention.

Although the following description is made in reference to a spring steel strip used in a foot-operated parking brake of a motor vehicle, such an application is merely an example and is not intended to limit the scope of the present invention. The present invention may be used in any application in which the end of a spring steel strip under heavy loading must be securely fastened.

A rotary spring made of spring steel strip 1 consists of a plurality of turns and is designed so that it abuts a rotatable cylindrical shaft 2 under tension, thereby forming a frictional connection between the spring and the shaft. A lever 3 constituting a foot brake is connected permanently with the rotatable shaft 2. When the lever 3 is pivoted in the direction indicated by arrow Z, a spring-loaded brake cable 4 articulated on the shaft 2 is tensioned, so that a brake (not shown) connected at the other end of the brake cable 4 is applied. When the lever 3 is actuated in the direction indicated by the arrow Z, the shaft 2 is rotated by the rotary spring consisting of the spring steel strip 1. After the lever 3 is actuated in the direction indicated by the arrow Z, the rotary spring made of the spring steel strip 1 securely engages the abutting shaft 2, holding the shaft 2 in the rotated position to prevent a backward movement of brake cable 4 in the direction of arrow Z, which would release the brake. As a result, the entire braking force acts on the free end of spring steel strip 1, which must be securely held by a mount 5 to prevent the brake from releasing. The other end 13 of steel strip 1 is designed to be held at a predetermined location in which it must occupy an exactly predetermined position. Because an exact position is specified for the end 13 of spring steel strip 1, tolerances in the dimensions of the rotary spring, i.e., the spring steel strip, result in variations in the position for mounting the steel strip end that comes to rest in the mount 5. The various positions relate to different circumferential as well as tangential positions relative to the shaft 2.

Figure 7:
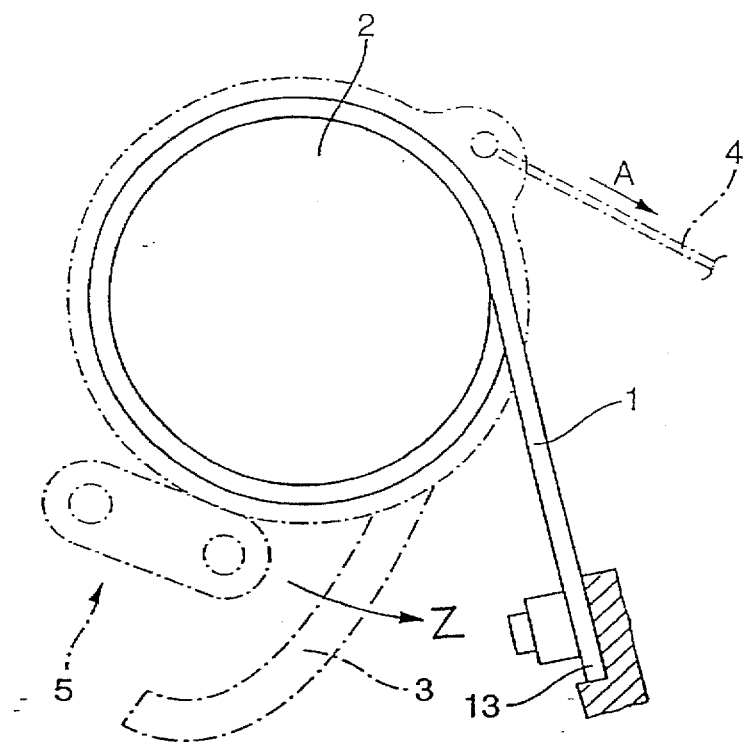
FIG. 7 is a schematic view of a foot-operated parking brake of a motor vehicle in which the present invention is applied.

In order to be able to secure the steel strip end in different positions in the mount 5 in a functionally reliable manner, an insert 6 is used. With such an insert 6, the spring steel strip end can be firmly clamped in the mount 5, which has two retainers 7, 8 that can be tensioned against one another. Of the two retainers, retainer 8 is shown in FIG. 7 while retainer 7 that is to be clamped against it is not shown there.

Figure 2:
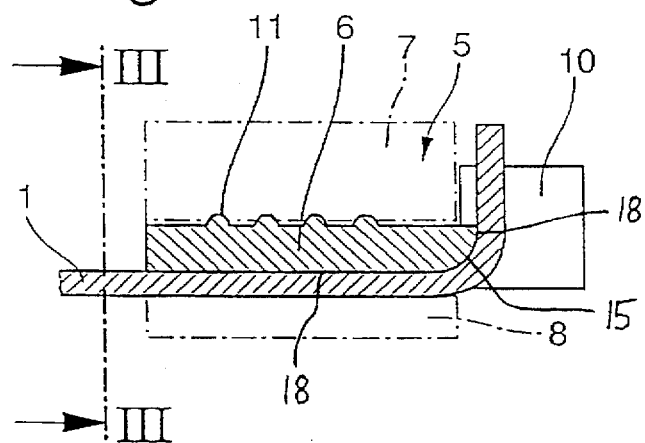
FIG. 2 is a sectional view taken along line II—II of FIG. 1.
Figure 3:
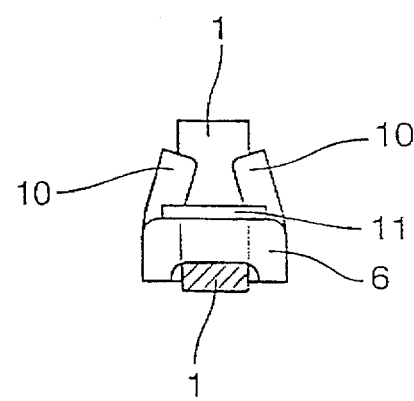
FIG. 3 is a sectional view taken along line III—III of FIG. 2.
Figure 4:
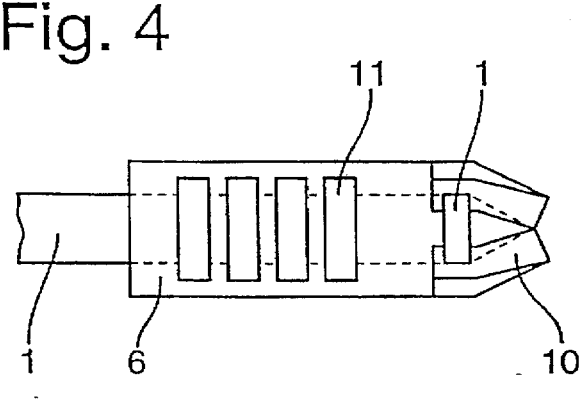
FIG. 4 is a top view of the apparatus shown in FIG. 2.

The end of steel strip 1 to be secured in the mount 5 is bent approximately at a right angle at a bent area 15 to define a bent end portion 20. The bent end portion is bent with a radius of sufficient size to avoid excessive stress or strain at the bent area 15. An insert 6 rests on the wide side 16 of the steel strip at the bent area 15 and is in surface-to-surface contact with the wide side of the steel strip. The insert 6 is laterally wider than the width of the steel strip and has a groove 17 which receives the steel strip 1 in a form-fitting manner. The groove 17 surrounds the steel strip 1 laterally and securely, as shown in FIG. 1, and has a height less than the depth of the steel strip. The longitudinal surface 18 of the insert 6 conforms to the surface of the steel strip 1, including along the inner radius of the bent area 15, as shown in FIG. 2. Continuous surface-to-surface contact also prevails between insert 6 and the bent area 15 of steel strip 1, as shown in FIGS. 2–4.

Figure 5:
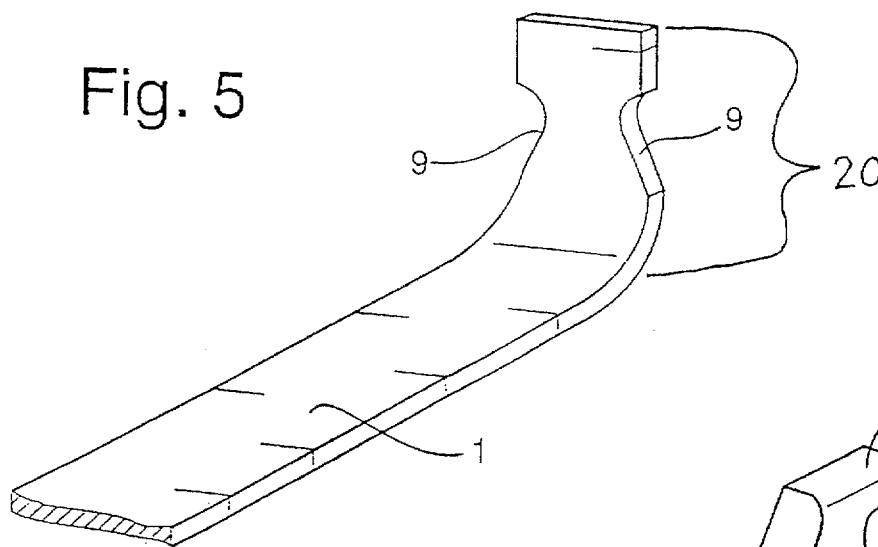
FIG. 5 is a perspective view of the end of the steel strip according to the present invention.
Figure 6:
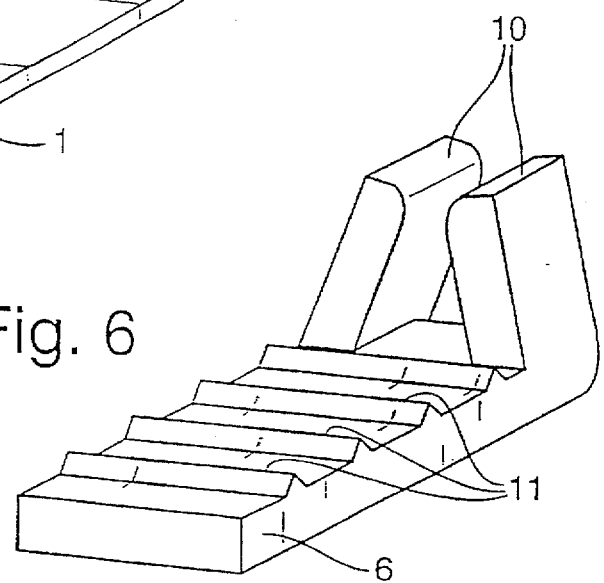
FIG. 6 is a perspective view of the insert according to the present invention.

As is most clearly shown in FIG. 5, the bent end of steel strip 1 has notches 9 located laterally and opposite one another. Insert 6 has tabs 10 which, when an insert 6 is placed on the steel strip end, can engage notches 9 securely. As a result of this surface-to-surface contact in notches 9 the spring strip end cannot slide out of insert 6 when tension is applied in the direction of arrow Z, as shown in FIG. 2. On its surface facing away from steel strip 1, insert 6 is provided with bead-shaped transverse blades 11 running crosswise to the lengthwise direction of the steel strip.

If spring steel strip 1 with insert 6 placed thereon is clamped between retainers 7 and 8 by bolts 12, transverse blades 11 securely engage the material of retainer 7, resulting in absolutely secure retention. For this engagement between the transverse blades 11 and the retainer 7, the material of the retainer 7 should be softer than that of the insert 6, to allow the transverse blades 11 to dig therein.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus comprising a spring steel strip having a cross-section defined by opposing wide sides and opposing narrow sides, said strip being bent at an angle to define a bent end portion, said bent end portion defining notches extending toward each other from opposing of said narrow sides of the strip, said apparatus further comprising:

an insert arranged at said bent end portion of the strip, said insert engaging said strip at said notches, said insert having a plurality of transverse blades; and two retainers, each said retainer having a contact surface, said two retainers being coupled to one another such that the contact surface of one of said retainers engages said transverse blades of said insert, and such that the contact surface of the other of said retainers engages the wide side of the strip located opposite said insert, said retainers clamping said strip and said insert therebetween.

2. An apparatus according to claim 1, wherein said insert is made of harder material than the adjoining retainer such that said transverse blades dig into the retainer material under the influence of the pressure exerted by the clamping of the retainers.

3. An apparatus according to claim 1, wherein said angle is approximately a right angle.

4. An apparatus according to claim 1, wherein said contact surfaces of the retainers are flat.

5. An apparatus according to claim 1, wherein said insert comprises a groove which receives said strip, said groove laterally surrounding said strip in an area over a partial height of the narrow sides of the strip.

6. An apparatus according to claim 1, wherein said insert comprises two tabs which engage said notches.

7. An apparatus according to claim 1, wherein a surface of said insert located opposite said transverse blades is configured to conform with each of said wide side of the strip located opposite said insert and the bent portion of the strip in a mating manner.

8. An apparatus according to claim 1, wherein said two retainers are coupled to one another via at least one bolt.

9. An apparatus according to claim 1, wherein said transverse blades extend in a direction of the width of said strip.

10. A combination of a spring steel strip with an apparatus for fastening an end of the spring steel strip, comprising:

said spring steel strip having a cross-section defined by opposing wide sides and opposing narrow sides, said strip being bent at an angle to define a bent end portion, said bent end portion defining notches extending toward each other from opposing of said narrow sides of the strip;

an insert arranged at said bent end portion of the strip, said insert engaging said strip at said notches, said insert having a plurality of transverse blades extending in a direction of the width of the strip; and two retainers, each said retainer having a contact surface, said two retainers being coupled to one another such that the contact surface of one of said retainers engages said transverse blades of said insert, and such that the contact surface of the other of said retainers engages the wide side of the strip located opposite said insert, said retainers clamping said strip and said insert therebetween.

11. A combination according to claim 10, wherein said insert is made of harder material than the adjoining retainer such that said transverse blades dig into the retainer material under the influence of the pressure exerted by the clamping of the retainers.

12. A combination according to claim 10, wherein said angle is approximately a right angle.

13. A combination according to claim 10, wherein said contact surfaces of the retainers are flat.

14. A combination according to claim 10, wherein said insert comprises a groove which receives said strip, said groove laterally surrounding said strip in an area over a partial height of the narrow sides of the strip.

15. A combination according to claim 10, wherein said insert comprises two tabs which engage said notches.

16. A combination according to claim 10, wherein a surface of said insert located opposite said transverse blades is configured to conform with each of said wide side of the strip located opposite said insert and the bent portion of the strip in a mating manner.

17. A combination according to claim 10, wherein said two retainers are coupled to one another via at least one bolt.

* * * * *